US00RE45528E

(19) United States
(12) Reissued Patent
Sawai

(10) Patent Number: US RE45,528 E
(45) Date of Reissued Patent: *May 26, 2015

(54) WIRELESS COMMUNICATION SYSTEM

(71) Applicant: SONY CORPORATION, Tokyo (JP)

(72) Inventor: Ryo Sawai, Tokyo (JP)

(73) Assignee: SONY CORPORATION, Tokyo (JP)

( * ) Notice: This patent is subject to a terminal disclaimer.

(21) Appl. No.: 13/901,182

(22) Filed: May 23, 2013

Related U.S. Patent Documents

Reissue of:
(64) Patent No.: 7,634,017
Issued: Dec. 15, 2009
Appl. No.: 11/108,664
Filed: Apr. 19, 2005

U.S. Applications:
(63) Continuation of application No. 13/326,024, filed on Dec. 14, 2011, now Pat. No. Re. 44,320, which is an application for the reissue of Pat. No. 7,634,017.

(30) Foreign Application Priority Data

Apr. 28, 2004 (JP) ..... 2004-134744

(51) Int. Cl.
*H04L 1/02* (2006.01)
*H04L 7/00* (2006.01)
(Continued)

(52) U.S. Cl.
CPC ..... *H04L 1/0003* (2013.01)

(58) Field of Classification Search
CPC ... H04L 1/0003; H04L 1/0002; H04L 1/0006; H04L 1/0033; H04L 1/0009; H04L 1/001; H04L 1/0693; H04L 1/0017; H04L 1/0687; H04L 1/0025; H04B 7/061; H04B 7/0417; H04B 7/0634; H04B 7/0697; H04B 7/0645; H04B 7/0619
USPC ..... 375/260, 267, 219, 224–225, 296, 316, 375/340, 358; 455/69, 522, 132, 68
See application file for complete search history.

(56) References Cited

U.S. PATENT DOCUMENTS 6,298,092 B1 * 10/2001 Heath et al. ..... 375/267
6,594,473 B1 * 7/2003 Dabak et al. ..... 455/101
(Continued)

FOREIGN PATENT DOCUMENTS

JP 11-055738 2/1999
JP 2004-040801 2/2004

OTHER PUBLICATIONS

Office Action mailed Dec. 31, 2007, in co-pending U.S. Appl. No. 11/108,664.
(Continued)

*Primary Examiner* — Khanh C Tran
(74) *Attorney, Agent, or Firm* — Oblon, McClelland, Maier & Neustadt, L.L.P.

(57) ABSTRACT

In order to transmit a large amount of data in series at a time with a MIMO communication scheme while avoiding deterioration of decoding characteristics due to change over time by a channel matrix, a wireless communication system uses an open-loop type and a closed-loop type of MIMO communication modes in combination and switches to the open-loop MIMO communication mode in response to the information that the amount of data to be transmitted at a time has exceeded a predetermined amount of bits or a predetermined transmission time during data transmission under the closed-loop MIMO communication mode. By discontinuing useless closed-loop MIMO communication and switching to the open-loop MIMO communication mode that is better than Zero-forcing, the decoding characteristics are prevented from simply becoming deteriorated.

36 Claims, 7 Drawing Sheets

(51) Int. Cl.
*H04B 7/00* (2006.01)
*H04L 1/00* (2006.01)

(56) References Cited

U.S. PATENT DOCUMENTS

| | | | | |
|---|---|---|---|---|
| 6,728,307 | B1 * | 4/2004 | Derryberry et al. | 375/219 |
| 6,937,592 | B1 * | 8/2005 | Heath et al. | 370/342 |
| 6,987,952 | B2 * | 1/2006 | Raghothaman | 455/101 |
| 7,266,157 | B2 * | 9/2007 | Sim et al. | 375/267 |
| 7,366,247 | B2 * | 4/2008 | Kim et al. | 375/267 |
| 7,372,912 | B2 * | 5/2008 | Seo et al. | 375/267 |
| 7,460,494 | B2 * | 12/2008 | Sandhu | 370/264 |
| 7,702,029 | B2 * | 4/2010 | Kotecha et al. | 375/267 |
| 8,130,855 | B2 | 3/2012 | Kwak et al. | |
| 2002/0196842 | A1 * | 12/2002 | Onggosanusi et al. | 375/148 |
| 2003/0161282 | A1 | 8/2003 | Medvedev et al. | |
| 2004/0001556 | A1 * | 1/2004 | Harrison et al. | 375/267 |
| 2004/0082356 | A1 * | 4/2004 | Walton et al. | 455/522 |
| 2004/0202257 | A1 | 10/2004 | Mejta et al. | |
| 2005/0135284 | A1 | 6/2005 | Nanda et al. | |
| 2005/0135295 | A1 | 6/2005 | Walton et al. | |
| 2005/0135318 | A1 | 6/2005 | Walton et al. | |
| 2005/0181739 | A1 | 8/2005 | Krasny et al. | |
| 2007/0105508 | A1 | 5/2007 | Tong et al. | |
| 2007/0263735 | A1 | 11/2007 | Tong et al. | |
| 2008/0075033 | A1 | 3/2008 | Shattil | |
| 2009/0147879 | A1 | 6/2009 | Sandhu | |
| 2010/0185777 | A1 | 7/2010 | Kim et al. | |
| 2011/0002400 | A1 | 1/2011 | Guerrieri et al. | |
| 2011/0002411 | A1 | 1/2011 | Forenza et al. | |
| 2011/0044193 | A1 | 2/2011 | Forenza et al. | |
| 2012/0128084 | A1 | 5/2012 | Aguirre et al. | |

OTHER PUBLICATIONS

Chinese Office Action issued Jul. 18, 2008, in Patent Application No. 200510068455.8 (with English-language translation).

Office Action mailed Jul. 22, 2008, in co-pending U.S. Appl. No. 11/108,664.

Office Action mailed Feb. 3, 2009, in co-pending U.S. Appl. No. 11/108,664.

* cited by examiner

WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 7,634,017, which issued Dec. 15, 2009. The previous reissue application U.S. Ser. No. 13/326,024 was filed Dec. 14, 2011 (this application is an application for reissue of U.S. Pat. No. 7,634,017). This present reissue application is a continuation reissue application of U.S. Ser. No. 13/326,024.*

CROSS REFERENCES TO RELATED APPLICATIONS

The present invention contains subject matter related to Japanese Patent Application JP 2004-134744 filed in the Japanese Patent Office on Apr. 28, 2004, the entire contents of which being incorporated herein by reference.

BACKGROUND OF THE INVENTION

1. Field of the Invention

The present invention relates to a wireless communication system such as a wireless LAN (Local Area Network) for communicating between a plurality of wireless stations, and in particular, to a wireless communication system for realizing broadband wireless transmission in communication environments such as in homes.

Further more specifically, the present invention relates to a wireless communication system for expanding transmission capacity by communication in which spatial multiplexing is utilized (MIMO communication), pairing a transmitter having a plurality of antennas with a receiver having a plurality of antennas. In particular, the present invention relates to a wireless communication system for transmitting a large amount of data in series at a time with a MIMO communication scheme, avoiding deterioration of decoding characteristics.

2. Description of the Related Art

Canonical standards concerning wireless networks can include IEEE (The Institute of Electrical and Electronics Engineers) 802.11 (e.g., see non-patent document 1), HiperLAN/2 (e.g., see non-patent document 2 or 3), IEEE802.15.3, and Bluetooth communication, for example. IEEE802.11 has enhanced standards such as IEEE802.11a (e.g., see non-patent document 4), b, and g depending on differences of wireless communication schemes and frequency bands.

IEEE802.11a supports a modulation scheme for achieving a maximum communication speed of 54 Mbps. However, there is desired a standard for realizing a higher bit rate for the communication speed. For example, in IEEE802.11n, with the aim of establishing a wireless LAN technology for realizing a high speed exceeding an actual throughput of 100 Mbps, the next generation of wireless LAN standards is being developed.

As a technology for realizing a higher speed of wireless communication, MIMO (Multi-Input Multi-Output) communication is coming to attention. This is a technology for expanding transmission capacity and achieving improvement in communication speed by realizing a spatial multiplexing transmission channel (hereinafter also referred to as "MIMO channel") with a plurality of respective antenna elements at a transmitter and a receiver. In the MIMO communication, good frequency utilization efficiency is obtained due to utilization of spatial multiplexing.

In a MIMO communication scheme, the transmitter distributes transmission data to a plurality of antennas and transmits it through a plurality of virtual MIMO channels, and the receiver obtains reception data by processing signals received by a plurality of antennas. The MIMO communication scheme utilizes channel characteristics as described and differs from a mere transmission/reception adaptive array. That is, the transmitter performs space-time coding on a plurality of transmission signals, which are then multiplexed, distributed to M antennas, and transmitted to a plurality of MIMO channels. The receiver performs space-time decoding on reception signals received by N antennas via the channels to obtain reception data. In this case, a channel model is composed of a radio wave environment around the transmitter (transfer function), a structure of channel space (transfer function), and a radio wave environment around the receiver (transfer function). In the case of multiplexing signals transmitted from each antenna, there occurs crosstalk. However, by signal processing at the receiver, each multiplexed signal can be extracted correctly without crosstalk.

As MIMO transmission schemes, a variety of schemes are proposed; however, how to exchange channel information between the transmitter and the receiver in accordance with an antenna configuration is a big issue for implementation.

In the case of exchanging the channel information, it is easy to perform a method of transmitting known information (preamble information) only from the transmitter to the receiver. In this case, the transmitter and the receiver are independent of each other to perform spatial multiplexing transmission, and this is called an open-loop type of MIMO transmission. As an extension of this method, there is a closed-loop type of MIMO transmission for producing an ideal spatial orthogonal channel between the transmitter and the receiver by feedback of preamble information also from the receiver to the transmitter.

The open-loop type of MIMO transmission can include V-BLAST (Vertical Bell Laboratories Layered Space Time) scheme for example (e.g., see patent document 1). The transmitter does not provide an antenna weighting factor matrix, and simply multiplexes and transmits signals for each antenna. In other words, a feedback procedure for obtaining the antenna weighting factor matrix is entirely omitted. The transmitter inserts training signals for performing channel estimation at the receiver, in a time-division manner, for example for each antenna, before transmitting multiplexed signals. On the other hand, the receiver performs the channel estimation using the training signals at a channel estimation unit and calculates a channel information matrix H corresponding to each antenna pair. By combing zero-forcing and canceling skillfully, a signal-to-noise ratio by utilizing a degree of freedom of each antenna that is caused by the canceling is improved and a degree of certainty of decoding is enhanced.

Further, as an ideal form for the closed-loop type of MIMO transmission, there is known a SVD-MIMO scheme utilizing singular value decomposition (SVD) of a propagation path function (e.g., see non-patent document 5).

In the SVD-MIMO transmission, $UDV^H$ is obtained by performing the singular value decomposition of a numerical matrix whose elements denote channel information corresponding to each antenna pair, namely the channel information matrix H, and the transmission antenna weighting factor matrix V and the reception antenna weighting factor matrix $U^H$ are obtained. Thus, each MIMO channel is expressed as the diagonal matrix D having the diagonal elements that are the square root of each eigenvalue $\lambda_i$, and signals can be multiplexed to be transmitted without any crosstalk. In this case, there can be realized a plurality of logically independent, space division (i.e., spatial orthogonal multiplexing) transmission channels.

It is generally assumed that, based on transmission channel information, the transmitter calculates an optimum antenna weighting factor and optimizes a coding rate and a modulation scheme that are applied to bit streams for each transmission antenna in the closed-loop type of MIMO scheme and thereby more appropriate information transmission can be realized. However, there is a problem that the closed-loop type of MIMO communication, in order to be introduced as a real system, needs higher frequency of feedback from the receiver to the transmitter in the case of a large channel fluctuation due to a move of the transmitter/receiver.

The open-loop type and the closed-loop type of MIMO communication schemes will be described below.

FIG. 7 schematically shows the configuration of a MIMO transmitter/receiver of the open-loop type. In this case, the transmitter transmits a data frame containing a preamble signal (TxPreamble) for estimating a propagation path. The receiver obtains a channel matrix H based on the received preamble signal and performs weighted reception of data division using a reception antenna weight calculated based on the channel matrix H. A feedback procedure is not performed from the receiver to the transmitter.

FIG. 8 schematically shows the configuration of a MIMO transmitter/receiver of the closed-loop type. In this case, the transmitter transmits a preamble signal (TxPreamble1) for estimating a propagation path. The receiver can obtain a channel matrix H based on the received preamble signal and sends feedback of a preamble signal (RxPreamble) for estimating the propagation path. The transmitter can obtain the channel matrix H based on the received preamble signal. Further, the transmitter obtains a transmission weight matrix based on the obtained channel matrix H and performs weighted transmission of a data frame to which a preamble signal (TxPreamble2) is attached. The receiver can obtain a new channel matrix based on the preamble signal (TxPreamble2) and performs weighted reception of a data frame using a reception weight matrix calculated from the channel matrix.

It is possible to exchange the preamble signals (TxPreamble and RxPreamble) between the transmitter and the receiver along with an RTS/CTS sequence for solving a hidden terminal. Further, the transmitter may transmit the preamble signal just one time. Furthermore, in the case where the reversibility of the propagation path is valid, the transmission may be made in order of RxPreamble to TxPreamble.

Thus, in both transmission schemes of the open-loop type and the closed-loop type, the receiver employs preamble information that estimates channel information of a certain time and demodulates the remaining data division.

In a communication system (such as the MIMO transmission scheme) for performing weighted transmission/reception based on the channel matrix H obtained from propagation path conditions, change over time by the channel matrix H becomes a problem. The channel matrix H changes every moment because of a change in, for example, room temperature or other atmospheres, a change in a reflected path due to a move of a person or a device, or the like. In particular, in the case of transmitting a large amount of data at a time, there occurs a channel fluctuation over time and the accuracy of the preamble information becomes deteriorated, so that the problem comes to the surface.

For example, in the processes of data transmission in the closed-loop type of MIMO communication system shown in FIG. 8, if transmission data is long, it is realistic that the transmitter inserts TxPreambles at fixed periods as necessary (see FIG. 9) and the receiver acquires channel matrices successively to establish communication. At this time, in the case of the closed-loop type, since the transmitter has established a transmission antenna weight, it is needless to say that the accuracy deterioration of the preamble information largely affects decoding characteristics.

[Patent document 1] Japanese Unexamined Patent Publication No. Hei 10-84324

[Non-patent document 1] International Standard ISO/IEC 8802-11:1999 (E) ANSI/IEEE Std 802.11, 1999 Edition, Part11: Wireless LAN Medium Access Control (MAC) and Physical Layer (PHY) Specifications

[Non-patent document 2] ETSI Standard ETSI TS 101761-1 V1.3.1 Broadband Radio Access Networks (BRAN); HIPERLAN Type 2; Data Link Control (DLC) Layer; Part1: Basic Data Transport Functions

[Non-patent document 3] ETSI TS 101 761-2 V1.3.1 Broadband Radio Access Networks (BRAN); HIPERLAN Type 2; Data Link Control (DLC) Layer; Part2: Radio Link Control (RLC) sublayer

[Non-patent document 4] Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-speed Physical Layer in the 5 GHZ Band

[Non-patent document 5] http://radio3.ee.uec.ac.jp/MIMO(IEICE_TS).pdf (as of Oct. 24, 2003)

SUMMARY OF THE INVENTION

It is desirable to provide a wireless communication system capable of expanding transmission capacity by communication in which spatial multiplexing is utilized (MIMO communication), pairing a transmitter having a plurality of antennas with a receiver having a plurality of antennas.

It is also desirable to provide a wireless communication system capable of transmitting a large amount of data in series at a time with a MIMO communication scheme, avoiding deterioration of decoding characteristics due to change over time by a channel matrix.

According to a first embodiment of the present invention, there is provided a wireless communication system in which a transmitter having a plurality of antennas and a receiver having a plurality of antennas form a pair and spatially multiplex and communicate a signal. The wireless communication system includes a closed-loop spatial multiplexing communication mode in which the transmitter transmits a signal for acquiring channel information to the receiver and the receiver sends feedback of the channel information to the transmitter, an open-loop spatial multiplexing communication mode in which only the transmitter transmits a signal for acquiring channel information to the receiver, and a mode switcher configured to switch between the closed-loop spatial multiplexing communication mode and the open-loop spatial multiplexing communication mode.

In this context, the term "system" signifies a logical set of a plurality of apparatuses (or function modules to implement a specific function). It is indefinite about whether or not the apparatuses or function modules are contained in a single cabinet.

In a wireless communication system according to an embodiment of the present invention, a transmitter having a plurality of antennas and a receiver having a plurality of antennas form a pair and spatially multiplex signals to perform MIMO communication.

In general, a MIMO communication system is broadly divided into an open-loop type for transmitting known information (preamble information) only from the transmitter to the receiver and a closed-loop type for producing an ideal spatial orthogonal channel between the transmitter and the receiver by feedback of the preamble information also from the receiver to the transmitter.

The closed-loop type of MIMO scheme can realize more appropriate information transmission. However, there is a problem that the closed-loop type of MIMO scheme needs higher frequency of feedback from the receiver to the transmitter in the case of a large channel fluctuation due to a move of the transmitter/receiver.

For example, in the case of transmitting a large amount of data at a time, there occurs a channel fluctuation over time and the accuracy of the preamble information becomes deteriorated, so that the problem comes to the surface. That is, due to a channel fluctuation during successive data communication, a channel matrix changes, and a transmission weight matrix V changes accordingly. Assume that the transmitter continues to use an old transmission weight matrix V by the closed-loop type of MIMO communication. As a result, although there should be originally formed a logically independent MIMO channel of which spatial orthogonality is maintained, crosstalk occurs between MIMO channels due to a difference between a transmission weight matrix V to be used and a correct transmission weight matrix $V_{new}$, so that decoding characteristics become extremely deteriorated.

According to SVD-MIMO communication which typically represents the closed-loop type of MIMO scheme, there can be originally formed an ideal spatial orthogonal channel between the transmitter and the receiver; however, as a result of having broken off learning of the channel matrix during long data communication, the decoding characteristics of the receiver in the closed-loop type of MIMO communication become deteriorated to the same degree as those of Zero-forcing (ZF) which has especially low decoding characteristics among MIMO schemes of the open-loop type. This is partly because both weighting schemes are similar in that a reception signal is multiplied by a channel inverse matrix $H^{-1}$ as a reception weight in Zero-forcing or multiplied by $U^H$ as a reception weight in SVD-MIMO.

The inventors of the present invention consider that it is useless to continue the closed-loop type of MIMO communication in a state of the deteriorated decoding characteristics and performing reception processing by the open-loop type of MIMO communication other than Zero-forcing brings about better decoding characteristics.

A wireless communication system according to an embodiment of the present invention uses the open-loop type and the closed-loop type of MIMO communication schemes in combination, and a mode switcher switches seamlessly between the closed-loop type of spatial multiplexing communication mode and the open-loop type of spatial multiplexing communication mode in accordance with a change in a propagation path, so that the deterioration of the decoding characteristics can be restrained within a certain limit.

For example, the mode switcher switches to the open-loop spatial multiplexing communication mode in response to the information that the amount of data to be transmitted at a time has exceeded a predetermined amount of bits or a predetermined transmission time during data transmission under the closed-loop spatial multiplexing communication mode. Thus, by discontinuing useless closed-loop MIMO communication and switching to the open-loop MIMO communication mode that is better than Zero-forcing, the decoding characteristics are prevented from simply becoming deteriorated.

Alternatively, the mode switcher may switch to the open-loop spatial multiplexing communication mode, estimating that the channel matrix has changed over time, in response to the information that an error rate has exceeded a predetermined value during data transmission under the closed-loop spatial multiplexing communication mode.

Further, in the case of adopting the SVD-MIMO communication as the closed-loop MIMO communication, the receiver can acquire the channel matrix H by channel estimation even during data reception and also a correct transmission weight matrix $V_{new}$ by singular value decomposition. The receiver may compare the correct transmission weight matrix $V_{new}$ with an old V that the transmitter continues to use, estimate that the channel matrix has changed over time when the difference between the correct transmission weight matrix $V_{new}$ and the old V exceeds a predetermined value, and switch to the open-loop spatial multiplexing communication mode.

Further, the transmitter transmits data that the transmitter does not apply a transmission weight V to under the open-loop spatial multiplexing communication mode, and thereby the deterioration of decoding characteristics of the receiver can be restrained.

Furthermore, the receiver employs an open-loop spatial multiplexing communication scheme (such as MMSE, BLAST, MMSE+BLAST, and Maximum Likelihood Estimation) other than a communication scheme (such as Zero-forcing) for providing a reception weight based on an inverse matrix of a channel matrix obtained from propagation path conditions under the open-loop spatial multiplexing communication mode, so that better decoding characteristics can be obtained compared to the case where only the closed-loop spatial multiplexing communication continues to be used, even if propagation path conditions have changed.

In a wireless communication system according to an embodiment of the present invention, the transmitter can switch to the open-loop spatial multiplexing communication mode, estimating that the channel matrix has changed over time, in response to the information that the information that the amount of data to be transmitted at a time has exceeded a predetermined amount of bits or a predetermined transmission time during data transmission under the closed-loop spatial multiplexing communication mode. In this case, the transmitter transmits data that the transmitter does not apply a transmission weight to and also informs the receiver that the transmitter has switched to the open-loop spatial multiplexing communication mode. Alternatively, in response to the information from the receiver that the receiver has switched to the open-loop spatial multiplexing communication mode, the transmitter also may switch to the open-loop spatial multiplexing communication mode.

Furthermore, the receiver can switch to the open-loop spatial multiplexing communication mode, estimating that the channel matrix has changed over time, according to a change in the transmission weight V obtained successively by singular value decomposition of the channel matrix and deterioration of reception characteristics such as an increase in a reception error rate, etc. In this case, the receiver switches to an open-loop MIMO communication scheme such as MMSE, BLAST, MMSE+BLAST, and Maximum Likelihood Estimation to avoid the deterioration of decoding characteristics by continuing the closed-loop type. Further, the receiver informs the transmitter that the receiver has switched to the open-loop spatial multiplexing communication mode. Alternatively, in response to the information from the transmitter that the transmitter has switched to the open-loop spatial multiplexing communication mode, the receiver also may switch to the open-loop spatial multiplexing communication mode.

Further, according to a second embodiment of the present invention, there is provided a computer program that is described in a computer-readable form so as to perform processing for spatially multiplexing and transmitting a signal to a receiver having a plurality of antennas on a computer system in a transmitter having a plurality of antennas. The computer program includes the steps of: performing closed-loop spatial multiplexing communication based on feedback information from the receiver, the closed-loop spatial multiplexing communication allowing the transmitter to perform weighted transmission; switching to open-loop spatial multiplexing communication in response to the information that the amount of data to be transmitted at a time has exceeded a predetermined amount of bits or a predetermined transmission time, the open-loop spatial multiplexing communication allowing the transmitter to perform non-weighted transmission; and performing the open-loop spatial multiplexing communication.

Furthermore, according to a third embodiment of the present invention, there is provided a computer program that is described in a computer-readable form so as to perform processing for receiving a multiplexed signal from a transmitter having a plurality of antennas on a computer system in a receiver having a plurality of antennas. The computer program includes the steps of: performing closed-loop spatial multiplexing communication on the assumption that a transmission weight has been applied by the transmitter, the closed-loop spatial multiplexing communication allowing the receiver to perform weighted reception; switching to open-loop spatial multiplexing communication in response to a change in a reception characteristic, the open-loop spatial multiplexing communication allowing the receiver to perform weighted reception; and performing the open-loop spatial multiplexing communication on the assumption that a transmission weight has been applied by the transmitter.

The computer program according to the second and third embodiments of the present invention is defined as a computer program described in a computer-readable form so as to implement specified processes on a computer system. In other words, when the computer program according to the second and third embodiments of the present invention is installed in a computer system, the computer system exhibits cooperative effects and operates as a communication apparatus. A plurality of such communication apparatuses can be activated to construct a wireless network. In this manner, it is possible to provide effects similar to those of the wireless communication system according to the first embodiment of the present invention.

According to the embodiment of the present invention, there can be provide a wireless communication system excellent at being able to expand transmission capacity by communication in which spatial multiplexing is utilized (MIMO communication), pairing a transmitter having a plurality of antennas with a receiver having a plurality of antennas.

According to the embodiment of the present invention, there can be provide a wireless communication system excellent at being able to transmit a large amount of data in series at a time with a MIMO communication scheme, avoiding the deterioration of decoding characteristics due to change over time by a channel matrix.

These and other features and advantages of the invention may be readily ascertained by referring to the following description of the embodiment and appended drawings.

DESCRIPTION OF THE PREFERRED EMBODIMENTS

The present invention relates to a MIMO communication system in which a transmitter having a plurality of antennas and a receiver having a plurality of antennas form a pair and spatially multiplex and communicate signals. In the description below, assume that the system is used in low-mobility environments such as in houses. First, a description will be given to a closed-loop type of MIMO communication scheme and its problem in the related art, and then a detailed description will be made of transmission/reception schemes according to an embodiment of the present invention with reference to the drawings and equations.

First, a reception signal y is expressed as follows:

$$y=Hx+n \tag{1}$$

where x is a transmission signal, H is propagation channel information, and n is a noise term.

Figure 8:
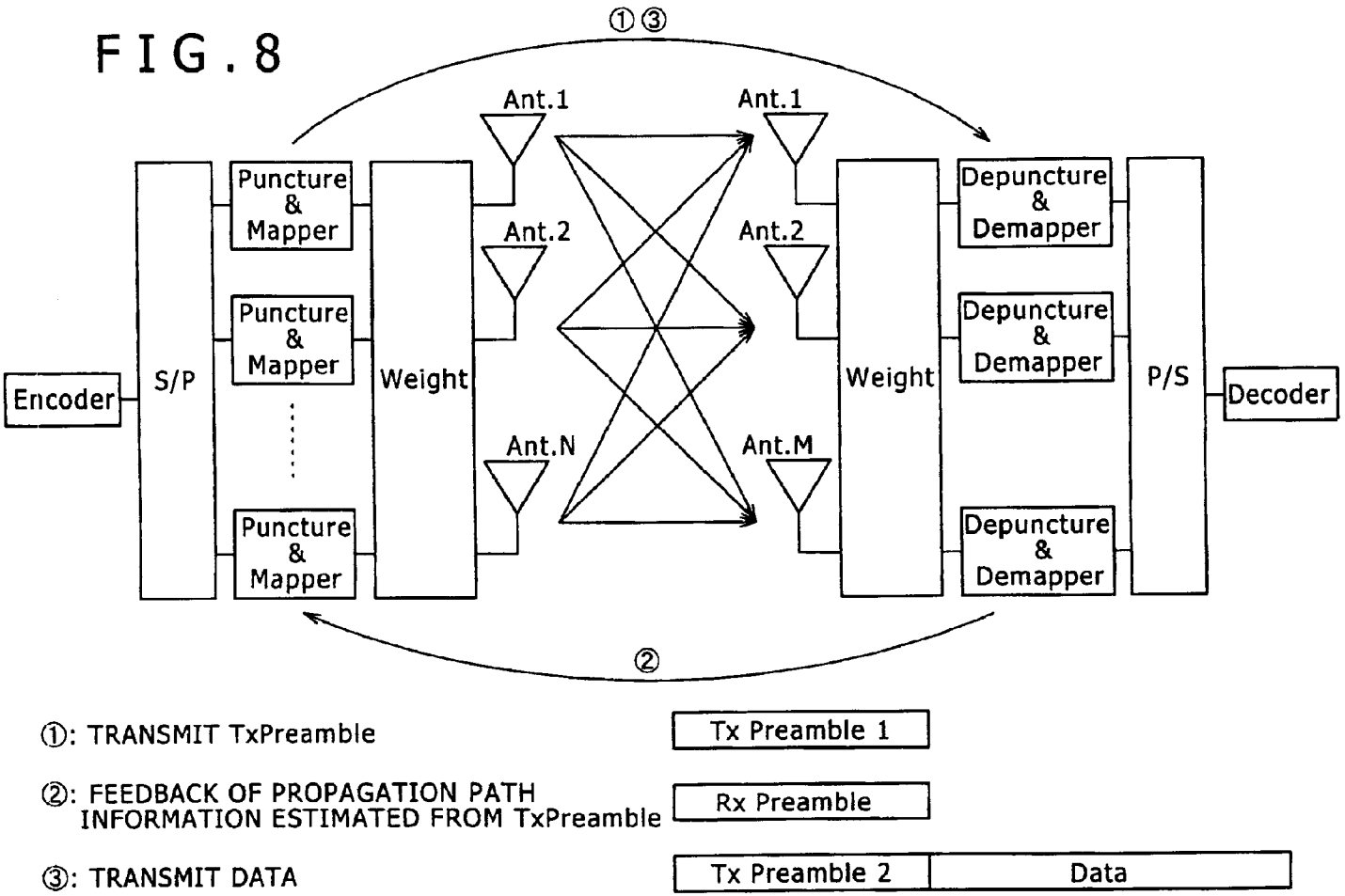
FIG. 8 schematically shows the configuration of a MIMO transmitter/receiver of a closed-loop type (example in related art).

By performing singular value decomposition (SVD) of the channel matrix H, the channel matrix H is expressed as follows:

$$H=UDV^H \tag{2}$$

where a matrix $V^H$ denotes a complex conjugate transpose matrix (Hamiltonian) of a matrix V. In general, the product of an original matrix multiplied by its complex conjugate transpose matrix is an identity matrix ($V \cdot V^H=I$) Therefore, in the closed-loop type of MIMO communication as shown in FIG. 8 for example, assuming that the receiver acquires the channel matrix H from TxPreamble and the transmitter acquires a transmission antenna weight V based on the feedback RxPreamble from the receiver to perform weighted transmission using the transmission antenna weight V, a reception signal y' at the receiver is expressed as follows:

$$y' = H(Vx) = UDx \tag{3}$$

Further, assuming that the receiver performs singular value decomposition of the channel matrix H acquired from TxPreamble and performs weighted reception using the obtained reception weight $U^H$, a reception signal y" is expressed as follows:

$$y'' = U^H y' = U^H UDx = Dx \tag{4}$$

where D denotes a diagonal matrix and is expressed as follows:

$$D = \begin{bmatrix} \sqrt{\lambda_1} & & & & 0 \\ & \sqrt{\lambda_2} & & & \\ \vdots & & \ddots & & \\ & & & \sqrt{\lambda_{n\cdot 1}} & \\ 0 & & & & \sqrt{\lambda_n} \end{bmatrix} \tag{5}$$

That is, in the SVD-MIMO transmission, $UDV^H$ is obtained by performing the singular value decomposition of a numerical matrix whose elements denote channel information corresponding to each antenna pair, namely the channel information matrix H, and the transmission antenna weighting factor matrix V and the reception antenna weighting factor matrix $U^H$ are obtained. Thus, each MIMO channel is expressed as the diagonal matrix D having the diagonal elements that are the square root of each eigenvalue $\lambda_i$, and signals can be multiplexed to be transmitted without any crosstalk.

Equation (5) shows that a transmission signal is given by power gain. Therefore, reception architecture in the closed-loop type of MIMO communication is basically the same as Zero Forcing (or Nulling) except for the difference that H- or $U^H$ is employed as the reception weight.

In such a case of transmitting a large amount of data in series at a time, there is a problem of change over time by the channel matrix. That is, in practice, the accuracy of the channel matrix H obtained from the preamble information located at the beginning of a data division from the transmitter becomes deteriorated in the case of a large channel fluctuation or sending long data at a time. Assume that the reception signal y' is originally obtained by the following equation:

$$y' = H(Vx) = (UDV)^H(Vx) \tag{6}$$

However, assuming that the channel matrix changes to $H_{new}$ due to a propagation path fluctuation, a practical reception signal $y_{new}$ is expressed as follows:

$$y_{new} = H_{new}(Vx) = UnewDnewV^H new(Vx) \tag{7}$$

As a matter of course, even though the receiver receives signals using a reception antenna weighting factor $U_{new}$ based on $H_{new}$ obtained from the preamble information, orthogonal channels are not formed, crosstalk occurs between MIMO channels which should be logically independent, and it results in a reception series in which interference waves remain.

This problem occurs because the accuracy of the transmission antenna weight V becomes deteriorated due to a fading channel fluctuation. In this embodiment, by switching from a closed-loop type of MIMO communication to an open-loop type of MIMO communication seamlessly, the accuracy deterioration of the transmission weight V is coped with by operation of the receiver alone to improve decoding characteristics.

The receiver stores an old V before measuring the accuracy of the transmission weight matrix V. The receiver calculates a correlation value with a certain period, based on a new transmission weight matrix $V_{new}$ estimated using a new transmission preamble (located at the beginning of a data division), and compares the correlation value with a reference threshold value. For example, a correlation value p can be calculated according to the following equation:

$$\rho = \frac{E[V_{ij}^{*} V_{ij}^{new}]}{\sqrt{E[|V_{ij}|^2]}\sqrt{E[|V_{ij}^{new}|^2]}} \tag{8}$$

where E[•] denotes an ensemble average.

In this case, if a transmission preamble is multiplied by an old transmission weight matrix V, a new transmission weight matrix $V_{new}$ can be obtained by multiplying $H_{new}V$ (estimated from the preamble information) by $V^H$ and calculating the following equation:

$$H_{new}(VV)^H = H_{new} = UnewDnewV^H new \tag{9}$$

The accuracy deterioration of the transmission weight V is due to a channel matrix fluctuation. The accuracy deterioration of V may be detected based on the deterioration of a reception error rate instead of the correlation between the old V and the new $V_{new}$ by the accuracy deterioration of V.

When the receiver confirms that the accuracy of V has deteriorated beyond the reference threshold value, the receiver stops performing the closed-loop type of MIMO communication and determines an optimum reception scheme by the open-loop type of MIMO communication.

Figure 1:
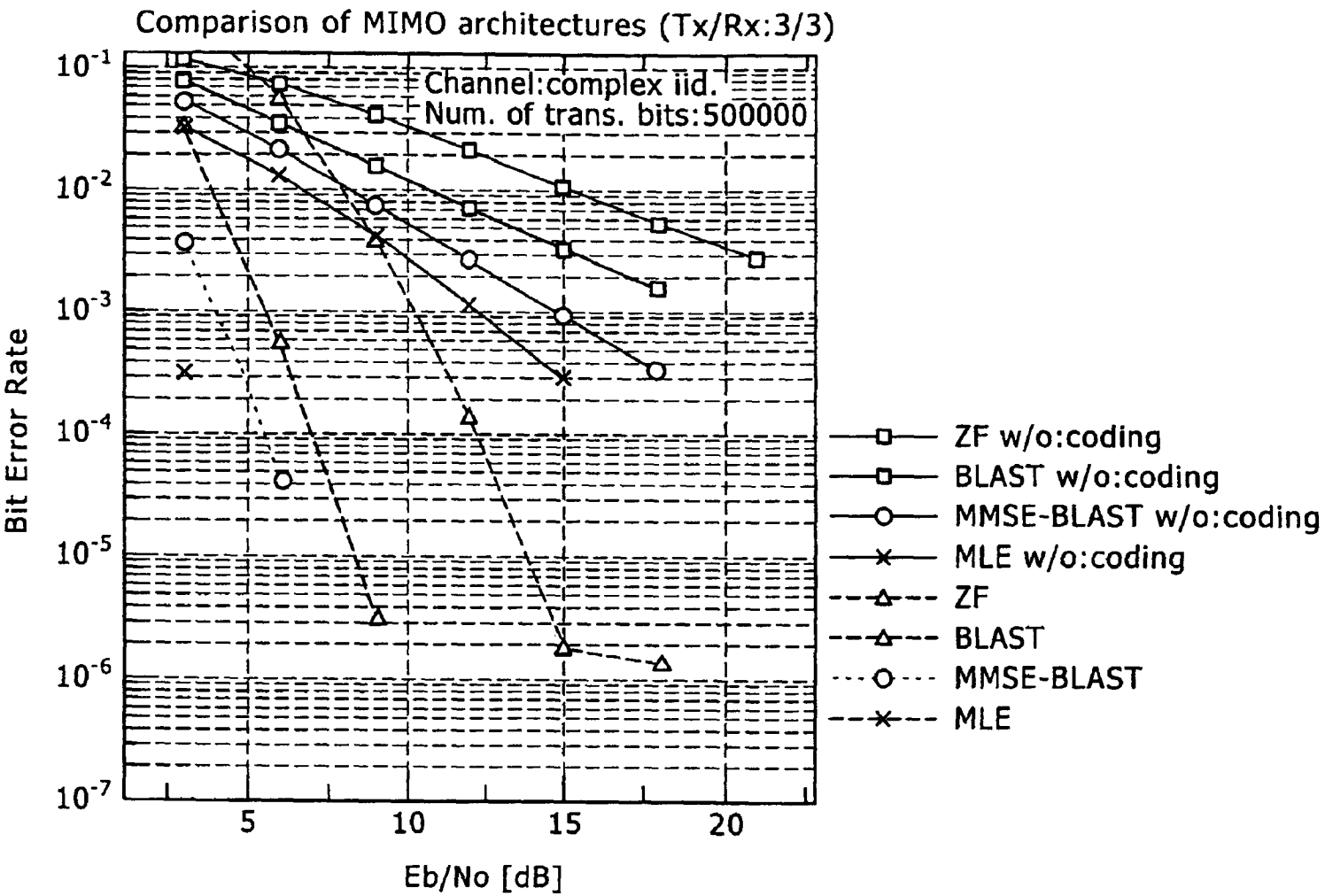
FIG. 1 shows Eb/No vs. bit error rate characteristics regarding each communication scheme on the assumption of MIMO having three respective antennas for transmission and reception.

In this context, the optimum reception scheme refers to schemes such as MMSE (Minimum Mean Square Error), BLAST (Bell Layered Architecture Space Time coding), MMSE+BLAST, Maximum Likelihood Estimation, and the like. However, in the case where hardware design does not allow a plurality of reception schemes, a reception scheme other than ZF is set to be ready for use. FIG. 1 shows, for reference, Eb/No vs. bit error rate characteristics on the assumption of MIMO having three respective antennas for transmission and reception. As shown in FIG. 1, in general, better decoding characteristics of the open-loop type are obtained in the following order. (It is known that the characteristic of MMSE alone is nearly similar to that of BLAST.)

ZF<MMSE<BLAST<MMSE+BLAST<Maximum Likelihood Estimation

According to an algorithm selected above, the following equation is obtained based on the reception signal $y_{new}=H_{new}(Vx)$ and using $(H_{new}\cdot V)^{-}$:

$$(H_{new}V)^{-}y_{new} = (H_{new}V)^{-}\cdot H_{new}(Vx) = x \quad (10)$$

In the case of also transmitting the preamble that is not multiplied by the transmission weight matrix V, the preamble is decoded using the stored old V to make $(H_{new}\cdot V)^{-}$.

Figure 9:
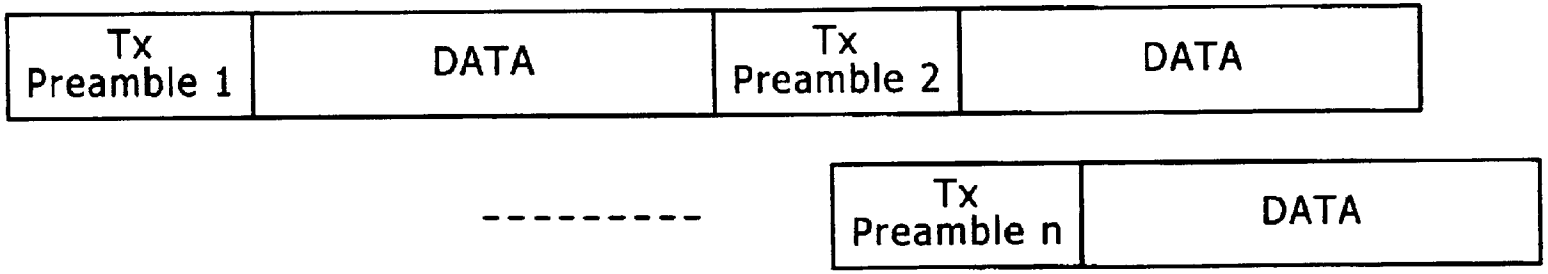
FIG. 9 shows a configuration example of transmission data.

If receiving operation is performed using equation (10), at the time of significant accuracy deterioration of V, it is anticipated that the decoding characteristics are approaching those of ZF stochastically under a complex iid. channel environment if the channel matrix H is updated using the periodical preamble information inserted into data divisions as shown in FIG. 9. That is, as a result of having broken off learning of the channel matrix during long data communication, the decoding characteristics of the receiver in the closed-loop type of MIMO communication become deteriorated to the same degree as those of ZF which has especially low decoding characteristics among MIMO schemes of the open-loop type.

In this embodiment, by switching reception schemes based on the fluctuation of the transmission weight V as described above, reception characteristics of extremely higher quality can be maintained compared to the case where only the closed-loop type continues to be used. Further, since signals are received using the closed-loop type at the beginning, better reception characteristics are obtained compared to the case where only the open-loop type is used. Furthermore, as a result, it is also possible to use only the open-loop type of reception scheme. The open-loop type of terminal can merely receive signals using $(H_{new}\cdot V)^{-}$ calculated from the preamble, and the closed-loop type and the open-loop type of MIMO communication schemes can coexist.

Moreover, there may be methods for stopping the transmission in which the transmission antenna weight V is employed and switching to wholly the closed-loop type of MIMO scheme with the following methods. A first method is as follows. The receiver detects the accuracy deterioration of V and notifies the transmitter to perform the open-loop type of communication with another communication device such as a PHS or a sensor network device, so that multiplication of the transmission antenna weight V is stopped. At this time, if different encoding or modulation depth is applied to each transmission branch, it is necessary to switch the encoding or the modulation depth as necessary before transmission.

A second method is as follows. After a series of procedures for the closed-loop type is executed, the number of transmissions of continuous bits, a period, etc. by which the accuracy of the transmission antenna weight V can be maintained within a permissible limit are determined beforehand, and the transmitter and the receiver are switched to the open-loop type of MIMO scheme based on the items predetermined above. At this time, if different encoding or modulation depth is applied to each transmission branch, it is necessary to switch the encoding or the modulation depth as necessary before transmission.

Figure 2:
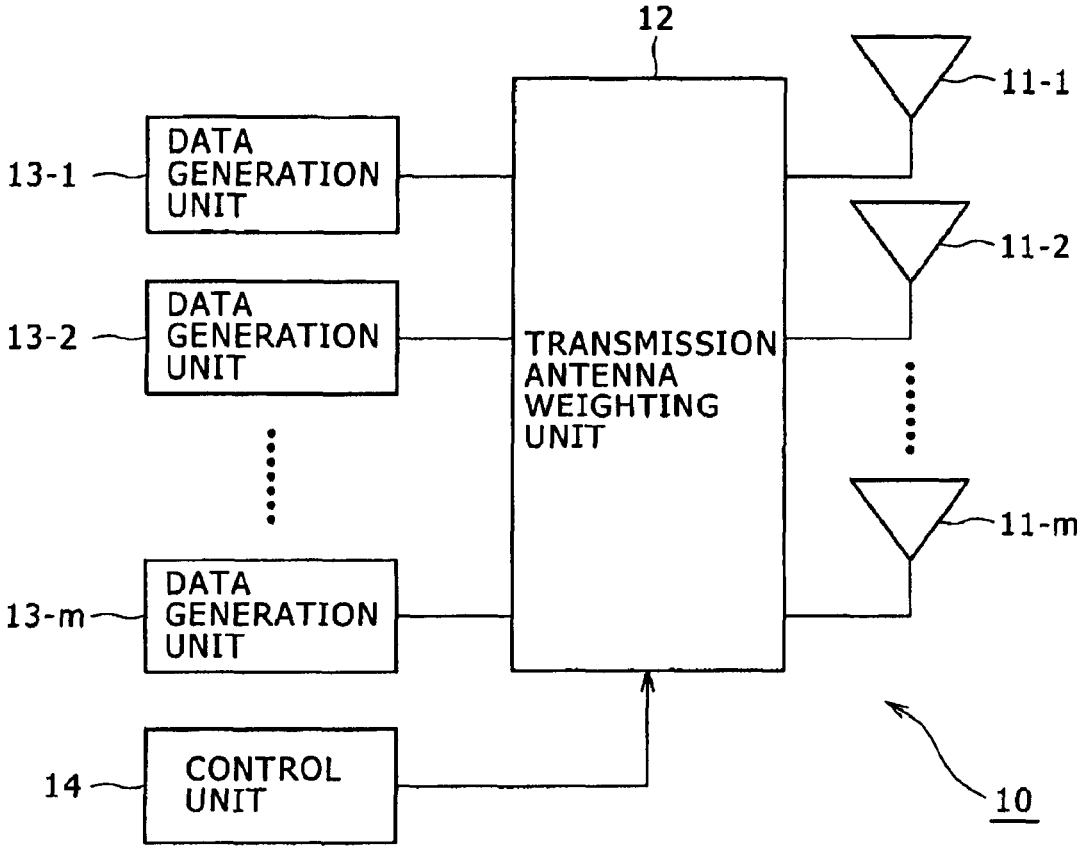
FIG. 2 schematically shows the function configuration of a transmitter which operates in a MIMO communication system in which a closed-loop type and an open-loop type coexist, according to an embodiment of the present invention.

FIG. 2 schematically shows the function configuration of a transmitter 10 which operates in a MIMO communication system in which the closed-loop type and the open-loop type coexist, according to this embodiment.

As shown in FIG. 2, the transmitter 10 has a plurality of transmission antennas 11-1, 11-2, . . . , 11-m and performs the MIMO communication using a plurality of streams formed between the transmitter and a receiver (described later) having a plurality of reception antennas.

Data generation units 13-1, 13-2, . . . , 13-m encode and modulate transmission data of each stream. A transmission antenna weighting unit 12 applies an antenna weight to each stream in accordance with an operational mode of either the closed-loop or the open-loop.

A control unit 14 controls transmission weighting in accordance with an operational mode of either the closed-loop or the open-loop.

The transmitter 10 operates basically in the closed-loop type of MIMO communication mode, acquires an appropriate transmission antenna weight V based on feedback information from the receiver, and transmits information more appropriately by adding the transmission weight.

Figure 3:
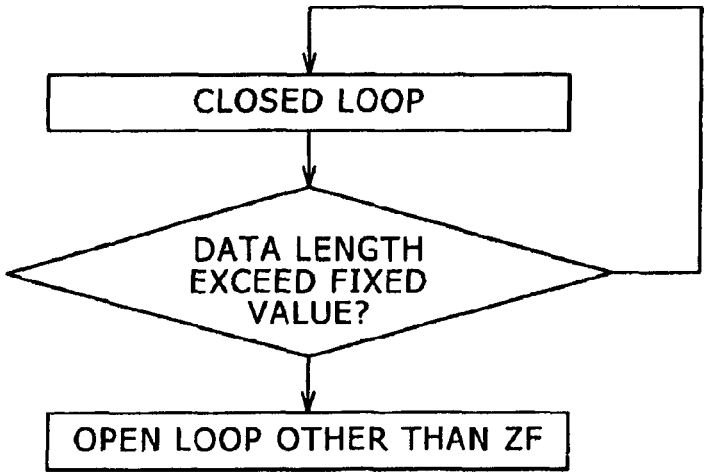
FIG. 3 is a flowchart showing an operation process of a transmitter.

In response to the information that the amount of data to be transmitted at a time has exceeded a predetermined amount of bits or a predetermined transmission time, the control unit 14 estimates that the channel matrix has changed over time and switches to the open-loop type of MIMO communication mode. FIG. 3 shows an operation process of the transmitter 10. This kind of operation prevents the decoding characteristics of the receiver in the closed-loop type of MIMO communication from becoming deteriorated to the same degree as those of ZF which has especially low decoding characteristics among MIMO schemes of the open-loop type.

The control unit 14 informs the receiver that the transmitter 10 side has switched to the open-loop type of MIMO communication mode. Alternatively, in response to the information from the receiver that the receiver has switched to the open-loop type of MIMO communication mode, the control unit 14 may switch to the open-loop type of MIMO communication mode.

Figure 4:
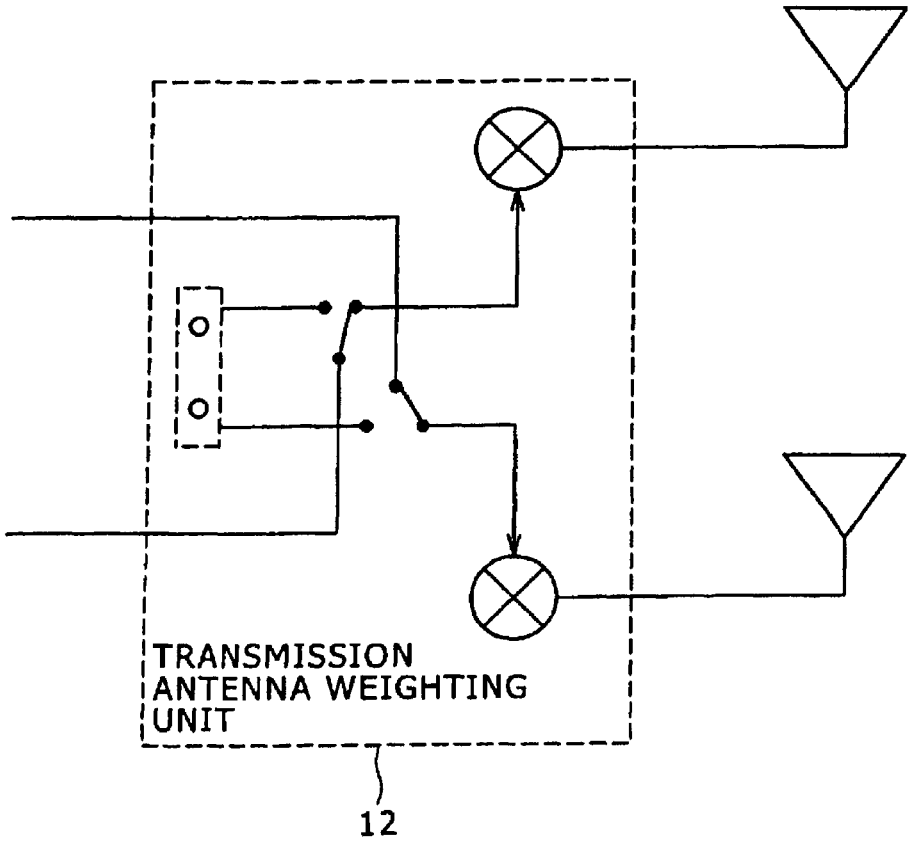
FIG. 4 shows an internal configuration of a transmission antenna weighting unit.

FIG. 4 shows an internal configuration of the transmission antenna weighting unit 12. As shown in FIG. 4, each stream transmission data is multiplied by an antenna weight under the closed-loop type of MIMO communication mode. However, under the open-loop type of MIMO communication mode, the transmission antenna weighting unit 12 is switched in such a way that data passes by, and the data is transmitted without a transmission weight.

Figure 5:
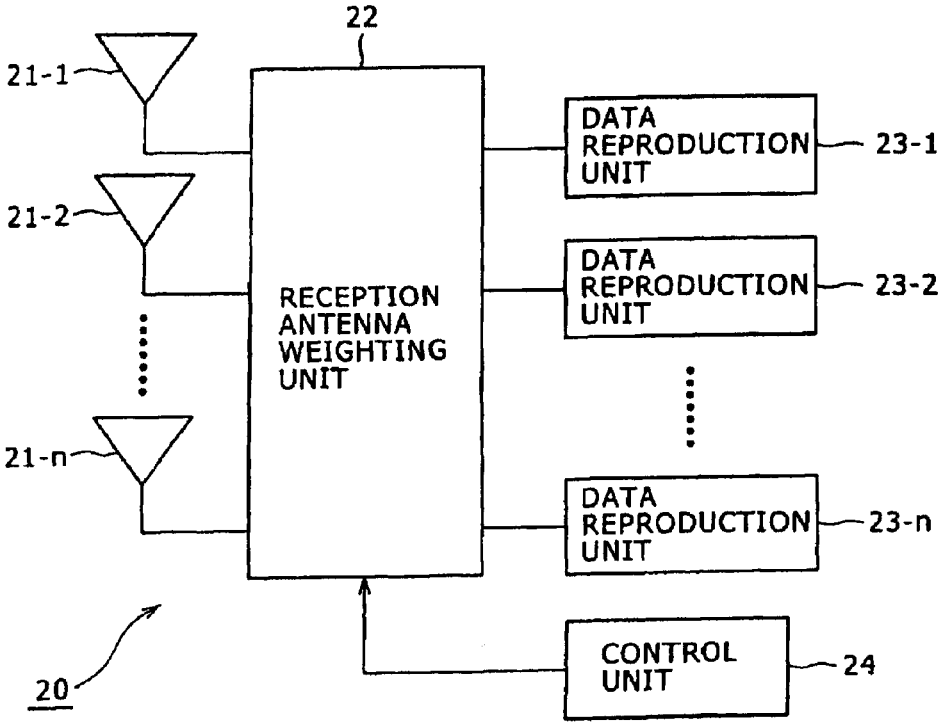
FIG. 5 schematically shows the function configuration of a receiver which operates in a MIMO communication system in which a closed-loop type and an open-loop type coexist, according to an embodiment of the present invention.

FIG. 5 schematically shows the function configuration of a receiver 20 which operates in a MIMO communication system in which the closed-loop type and the open-loop type coexist, according to this embodiment.

As shown in FIG. 5, the receiver 20 has a plurality of reception antennas 21-1, 21-2, . . . , 21-n and performs the MIMO communication using a plurality of streams formed between the receiver and the transmitter having a plurality of transmission antennas.

Data reproduction units 23-1, 23-2, . . . , 23-n demodulate and decode the transmission data of each stream. A reception antenna weighting unit 22 applies an antenna weight to each reception stream in accordance with an operational mode of either the closed-loop or the open-loop.

The receiver 20 operates basically in the closed-loop type of MIMO communication mode, acquires the channel matrix H based on a reference signal from the transmitter, and transmits feedback information to the transmitter. The receiver 20 transmits information more appropriately by adding the reception antenna weight.

Figure 6:
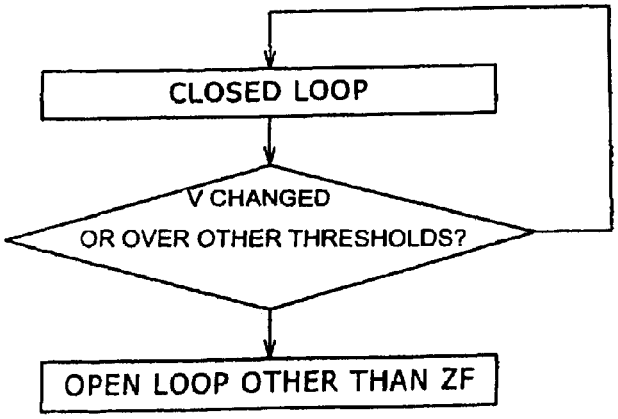
FIG. 6 is a flowchart showing an operation process of a receiver.
Figure 7:
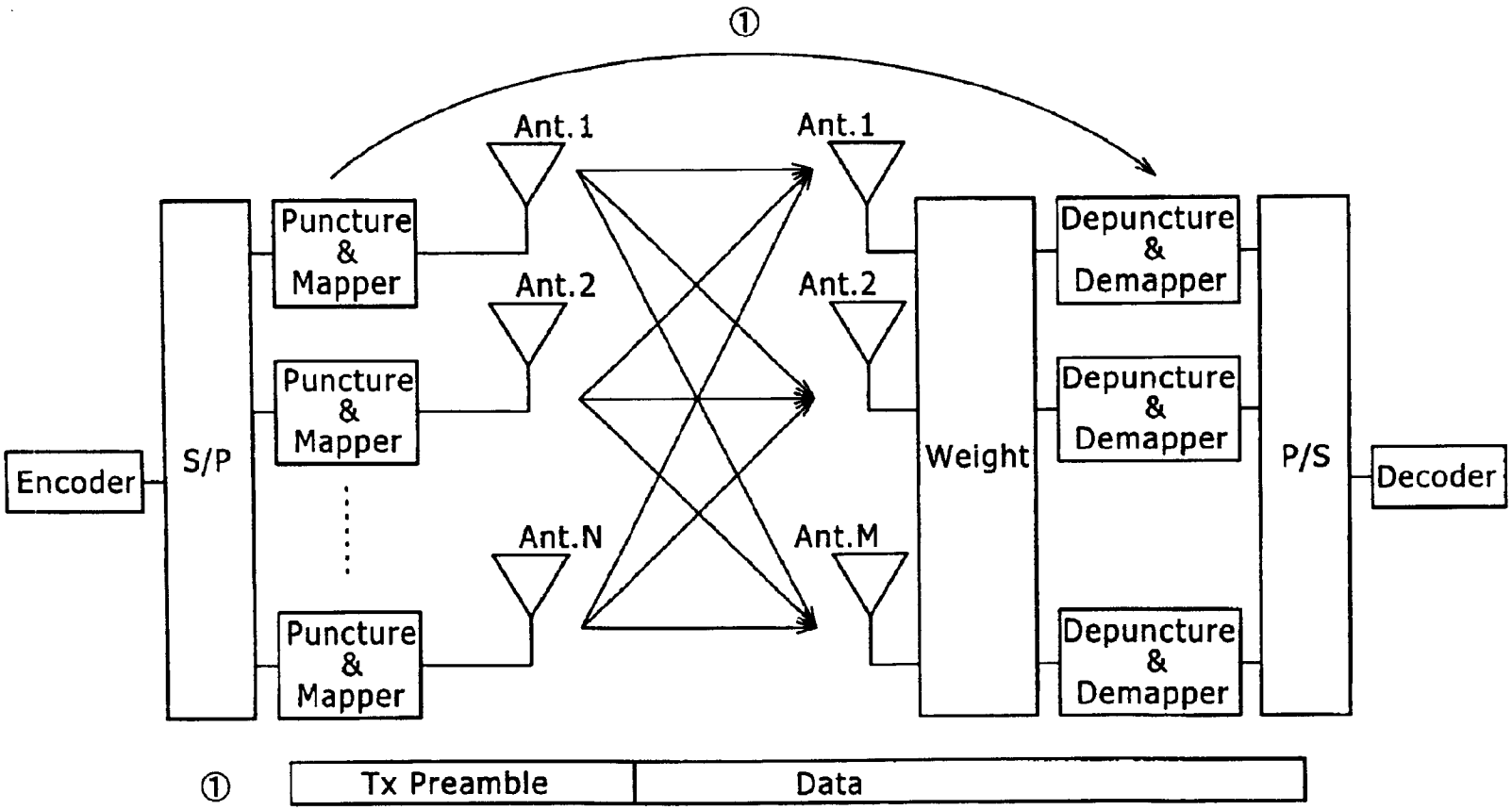
FIG. 7 schematically shows the configuration of a MIMO transmitter/receiver of an open-loop type (example in related art).

According to a change in the transmission weight V obtained successively by singular value decomposition of the channel matrix and deterioration of reception characteristics such as an increase in a reception error rate, etc., a control unit 24 estimates that the channel matrix has changed over time and switches to the open-loop type of MIMO communication mode. FIG. 6 shows an operation process of the receiver 20. This kind of operation prevents the decoding characteristics in the closed-loop type of MIMO communication from becoming deteriorated to the same degree as those of ZF which has especially low decoding characteristics among MIMO schemes of the open-loop type.

The control unit 24 informs the transmitter 10 that the receiver 20 side has switched to the open-loop type of MIMO communication mode. Alternatively, in response to the information from the transmitter 10 that the transmitter has switched to the open-loop type of MIMO communication mode, the control unit 24 may switch to the open-loop type of MIMO communication mode. The information that the receiver side has switched to the open-loop type of spatial multiplexing communication mode may be sent to the transmitter by the MIMO communication which is the same as the data communication channel; however, the information may be sent using a wireless communication scheme other than the MIMO communication channel, such as a wireless LAN transmission channel, a sensor network, or the like.

The reception antenna weighting unit 22 determines an antenna weight according to a reception scheme determined by the control unit 24. Under the open-loop type of MIMO communication mode, there are applied communication schemes other than Zero-forcing, such as MMSE, BLAST, MMSE+BLAST, Maximum Likelihood Estimation, etc.

In each reception architecture of the open-loop and the closed-loop, circuit processing units including generalized inverse matrix arithmetic circuits such as Moore Penrose and LU decomposition, a complex conjugate multiplication circuit for antenna weighting, and arithmetic circuits regarding CDM and OFDM decoding can be shared among reception schemes.

The present invention has been described in detail with reference to a specific embodiment. However; it is obvious that those skilled in the art can alter or modify the embodiment without departing from the scope and sprit of the invention. That is, the present invention has been disclosed in the form of exemplification, and the contents of the specification should not be interpreted restrictively. To understand the subject matter of the present invention, the appended claims should be taken into consideration.

What is claimed is:

[1. A wireless communication system in which a transmitter having a plurality of antennas and a receiver having a plurality of antennas form a pair and spatially multiplex and communicate a signal, the wireless communication system comprising:

a closed-loop spatial multiplexing communication mode in which the transmitter transmits a signal for acquiring channel information to the receiver and the receiver sends feedback of the channel information to the transmitter;

an open-loop spatial multiplexing communication mode in which only the transmitter transmits a signal for acquiring channel information to the receiver; and a mode switcher configured to switch between the closed-loop spatial multiplexing communication mode and the open-loop spatial multiplexing communication mode, and switch to the open-loop spatial multiplexing communication mode in response to information indicating that an amount of data to be transmitted has exceeded a predetermined data limit or a transmission time during data transmission under the closed-loop spatial multiplexing communication mode has exceeded a predetermined time limit.]

[2. The wireless communication system of claim 1, wherein the mode switcher is further configured to switch to the open-loop spatial multiplexing communication mode in response to the information that an error rate has exceeded a predetermined value during data transmission under the closed-loop spatial multiplexing communication mode.]

[3. The wireless communication system according to claim 1, wherein the transmitter transmits data that the transmitter does not apply a transmission weight to under the open-loop spatial multiplexing communication mode.]

[4. The wireless communication system of claim 1, wherein the receiver performs an open-loop spatial multiplexing communication operation other than a communication scheme for providing a reception weight based on an inverse matrix $H^{-}$ of a channel matrix obtained from a propagation path condition under the open-loop spatial multiplexing communication mode.]

[5. The wireless communication system according to claim 1, wherein said mode switcher is further configured to switch between the closed-loop spatial multiplexing communication mode and the open-loop spatial multiplexing communication mode, and inform the receiver that a mode has been switched to the open-loop spatial multiplexing communication mode.]

[6. A wireless communication system in which a transmitter having a plurality of antennas and a receiver having a plurality of antennas form a pair and spatially multiplex and communicate a signal, the wireless communication system comprising:

a closed-loop spatial multiplexing communication mode in which the transmitter transmits a signal for acquiring channel information to the receiver, the receiver sends feedback of the channel information to the transmitter, the receiver finds a channel matrix H by receiving a reference signal sent from the transmitter, obtains a reception weight matrix $U^H$, a diagonal matrix D and a transmission weight matrix V by performing singular value decomposition of the channel matrix H into $UDV^H$, and sends feedback of the transmission weight matrix V to the transmitter, there is performed Singular Value Decomposition-Multiple Input Multiple Output (SVD-MIMO) communication in which the transmitter performs weighted transmission with the transmission weight matrix V and the receiver performs weighted reception with the reception weight matrix $U^H$;

an open-loop spatial multiplexing communication mode in which only the transmitter transmits a signal for acquiring channel information to the receiver; and a mode switcher configured to switch between the closed-loop spatial multiplexing communication mode and the open-loop spatial multiplexing communication mode, and switch to the open-loop spatial multiplexing communication mode in response to the information that the transmission weight matrix V obtained by the singular value decomposition has changed beyond a predetermined value during data transmission under the closed-loop spatial multiplexing communication mode.]

[7. A wireless communication apparatus having a plurality of antennas that spatially multiplexes and transmits a signal to a receiver having a plurality of antennas, the wireless communication apparatus comprising:

a closed-loop spatial multiplexing communication mode in which the apparatus performs weighted transmission based on feedback information from the receiver;

an open-loop spatial multiplexing communication mode in which the apparatus performs non-weighted transmission; and a mode switcher configured to switch between the closed-loop spatial multiplexing communication mode and the open-loop spatial multiplexing communication mode, and switch to the open-loop spatial multiplexing communication mode in response to information indicating that an amount of data to be transmitted has exceeded a predetermined data limit or a transmission time during data transmission under the closed-loop spatial multiplexing communication mode has exceeded a predetermined time limit.]

[8. The wireless communication apparatus of claim 7, wherein said mode switcher is further configured to switch between the closed-loop spatial multiplexing communication mode and the open-loop spatial multiplexing communication mode, and switch to the open-loop spatial multiplexing communication mode in response to information that an error rate has exceeded a predetermined value during data transmission under the closed-loop spatial multiplexing communication mode.]

[9. A wireless communication apparatus having a plurality of antennas that spatially multiplexes and transmits a signal to a receiver having a plurality of antennas, the wireless communication apparatus comprising:

a closed-loop spatial multiplexing communication mode in which the apparatus performs weighted transmission based on feedback information from the receiver;

an open-loop spatial multiplexing communication mode in which the apparatus performs non-weighted transmission; and a mode switcher configured to switch between the closed-loop spatial multiplexing communication mode and the open-loop spatial multiplexing communication mode, and switch to the open-loop spatial multiplexing communication mode in response to the information from the receiver that a mode has been switched to the open-loop spatial multiplexing communication mode.]

[10. A wireless communication apparatus having a plurality of antennas that spatially multiplexes and transmits a signal to a receiver having a plurality of antennas, the wireless communication apparatus comprising:

a closed-loop spatial multiplexing communication mode in which the apparatus performs weighted transmission based on feedback information from the receiver;

an open-loop spatial multiplexing communication mode in which the apparatus performs non-weighted transmission;

a mode switcher configured to switch between the closed-loop spatial multiplexing communication mode and the open-loop spatial multiplexing communication mode;

a feedback information receiving section configured to receive feedback information for acquiring a transmission weight matrix V from the receiver and perform Singular Value Decomposition-Multiple Input Multiple Output (SVD-MIMO) transmission of weighted transmission by the transmission weight matrix V under the closed-loop spatial multiplexing communication mode; and a transmitting section configured to transmit data to which the apparatus does not apply the transmission weight V under the open-loop spatial multiplexing communication mode.]

[11. A wireless communication apparatus having a plurality of antennas that receives a multiplexed signal from a transmitter having a plurality of antennas, the wireless communication apparatus comprising:

a closed-loop spatial multiplexing communication mode in which the apparatus sends feedback of channel information to the transmitter, finds a channel matrix H by receiving a reference signal sent from the transmitter, obtains a reception weight matrix $U^H$, a diagonal matrix D and a transmission weight matrix V by performing singular value decomposition of the channel matrix H into $UDV^H$, and performs Singular Value Decomposition-Multiple Input Multiple Output (SVD-MIMO) communication using weighted reception with the reception weight matrix $U^H$ and sends feedback of the transmission weight matrix V to the transmitter;

an open-loop spatial multiplexing communication mode in which the apparatus does not send feedback of channel information to the transmitter; and a mode switcher configured to switch between the closed-loop spatial multiplexing communication mode and the open-loop spatial multiplexing communication mode, and switch to the open-loop spatial multiplexing communication mode in response to the information that the transmission weight matrix V obtained by the singular value decomposition has changed beyond a predetermined value during data transmission under the closed-loop spatial multiplexing communication mode.]

[12. A wireless communication apparatus having a plurality of antennas that receives a multiplexed signal from a transmitter having a plurality of antennas, the wireless communication apparatus comprising:

a closed-loop spatial multiplexing communication mode in which the apparatus sends feedback of channel information to the transmitter;

an open-loop spatial multiplexing communication mode in which the apparatus does not send feedback of channel information to the transmitter; and a mode switcher configured to switch between the closed-loop spatial multiplexing communication mode and the open-loop spatial multiplexing communication mode, and inform the transmitter that a mode has been switched to the open-loop spatial multiplexing communication mode.]

[13. The wireless communication apparatus of claim 12, wherein the mode switcher is further configured to switch to the open-loop spatial multiplexing communication mode in response to the information from the transmitter that a mode has been switched to the open-loop spatial multiplexing communication mode.]

[14. A wireless communication apparatus having a plurality of antennas that receives a multiplexed signal from a transmitter having a plurality of antennas, the wireless communication apparatus comprising:

a closed-loop spatial multiplexing communication mode in which the apparatus sends feedback of channel information to the transmitter;

an open-loop spatial multiplexing communication mode in which the apparatus does not send feedback of channel information to the transmitter;

a mode switcher configured to switch between the closed-loop spatial multiplexing communication mode and the open-loop spatial multiplexing communication mode; and a communication section configured to perform an open-loop spatial multiplexing communication operation other than a communication scheme for providing a reception weight based on an inverse matrix I-V of a channel matrix obtained from a propagation path condition under the open-loop spatial multiplexing communication mode.]

[15. A wireless communication method for spatially multiplexing and transmitting a signal to a receiver having a plurality of antennas in a transmitter having a plurality of antennas, the wireless communication method comprising:

performing closed-loop spatial multiplexing communication based on feedback information from the receiver, the closed-loop spatial multiplexing communication allowing the transmitter to perform weighted transmission;

switching to open-loop spatial multiplexing communication in response to information indicating that an amount of data to be transmitted has exceeded a predetermined data limit or a transmission time during data transmission under the closed-loop spatial multiplexing communication mode has exceeded a predetermined time limit; and performing the open-loop spatial multiplexing communication.]

[16. A wireless communication method for receiving a multiplexed signal from a transmitter having a plurality of antennas in a receiver having a plurality of antennas, the wireless communication method comprising the steps of:

performing closed-loop spatial multiplexing communication on the assumption that a transmission weight has been applied by the transmitter, the closed-loop spatial multiplexing communication allowing the receiver to perform weighted reception;

switching to open-loop spatial multiplexing communication in response to a change in a reception characteristic, the open-loop spatial multiplexing communication allowing the receiver to perform weighted reception;

performing the open-loop spatial multiplexing communication on the assumption that a transmission weight has been applied by the transmitter.]

[17. A computer-readable medium storing a computer program which when executed on a computer causes the computer to perform processing for spatially multiplexing and transmitting a signal to a receiver having a plurality of antennas from a transmitter having a plurality of antennas, comprising:

performing closed-loop spatial multiplexing communication based on feedback information from the receiver, the closed-loop spatial multiplexing communication allowing the transmitter to perform weighted transmission;

switching to open-loop spatial multiplexing communication in response to information indicating that an amount of data to be transmitted has exceeded a predetermined data limit or a transmission time during data transmission under the closed-loop spatial multiplexing communication mode has exceeded a predetermined time limit; and performing the open-loop spatial multiplexing communication.]

[18. A computer-readable medium storing a computer program which when executed on a computer causes the computer to perform processing for spatially multiplexing and transmitting a signal to a receiver having a plurality of antennas, in a transmitter having a plurality of antennas, comprising:

performing closed-loop spatial multiplexing communication by performing weighted transmission based on feedback information from the receiver;

performing open-loop spatial multiplexing communication in which the transmitter performs non-weighted transmission;

switching between the closed-loop spatial multiplexing communication and the open-loop spatial multiplexing communication, and switching to the open-loop spatial multiplexing communication in response to information from the receiver that a mode has been switched to the open-loop spatial multiplexing communication mode.]

*19. An information processing apparatus comprising:*

*processing circuitry configured to:*

*receive feedback information from a receiver in a closed loop spatial multiplexing communication mode;*

*send a signal in the closed loop spatial multiplexing communication mode or a different spatial coding communication mode in which control information is used; and*

*switch to the different spatial coding communication mode according to a failure of communication.*

*20. An information processing apparatus comprising:*

*processing circuitry configured to:*

*transmit feedback information in a closed loop spatial multiplexing communication mode;*

*receive a signal in the closed loop spatial multiplexing communication mode or a different spatial coding communication mode in which control information is used;*

*switch to the different spatial communication mode according to a failure of communication.*

*21. A wireless communication apparatus having one or more antennas comprising:*

*processing circuitry configured to:*

*send training signals to a receiver;*

*receive feedback information from the receiver in a closed loop spatial multiplexing communication mode;*

*calculate transmit weights in consideration of the feedback information;*

*transmit a signal in the closed loop spatial multiplexing communication mode using the transmit weights or a different spatial coding communication mode in which control information is used; and*

*switch to the different spatial coding communication mode according to a change in a communication quality.*

*22. A wireless communication apparatus of claim 21, wherein the processing circuitry is further configured to:*

*estimate channel state information based on training signals transmitted from receiver.*

*23. A wireless communication apparatus comprising:*

*a plurality of antennas;*

*processing circuitry configured to:*

*estimate a channel state information based on training signals transmitted from a transmitter;*

*transmit feedback information in a closed loop spatial multiplexing communication mode;*

*receive a signal in the closed loop spatial multiplexing communication mode and a different spatial coding communication mode in which control information is used; and*

*switch to the different spatial communication mode according to a failure of communication.*

*24. A wireless communication apparatus of claim 23, wherein the processing circuitry is further configured to:*

*send training signals to the transmitter.*

*25. A wireless communication apparatus comprising:*

*a plurality of antennas configured to transmit and receive signals from another wireless communication apparatus having a plurality of antennas;*

*a feedback information calculating unit configured to calculate feedback information to transmit in a closed loop spatial multiplexing communication mode;*

*a control unit configured to determine which receiving scheme to use, for the closed loop spatial multiplexing communication mode or for a different spatial coding communication mode in which control information is used, in response to a detection of a change in a reception characteristic;*

*a receive weight calculating unit configured to calculate receive weights based on the determined receiving scheme.*

*26. A wireless communication apparatus of claim 25,*

*wherein the receive weight calculating unit calculate receive weights according to at least one of MMSE, BLAST, MMSE+BLAST, maximum likelihood estimation criteria when the determined receiving scheme is for the different spatial coding communication mode.*

*27. A wireless communication apparatus comprising:*

*a plurality of antennas configured to transmit and receive signals from another wireless communication apparatus having one or more antennas;*

*a feedback information calculating unit configured to calculate feedback information to transmit in a closed loop spatial multiplexing communication mode; and*

*a control unit configured to determine which receiving scheme to use, for the closed loop spatial multiplexing communication mode or for a different spatial coding communication mode in which control information is used, in response to a detection of a change in a reception characteristic;*

*a receive signal processing unit configured to decode receive signals in a processing scheme corresponding to the determined receiving scheme.*

*28. A wireless communication apparatus having one or more antennas comprising:*

*a transmitting unit configured to transmit feedback information in a closed loop spatial multiplexing communication mode;*

*a receiving unit configured to receive a signal in the closed loop spatial multiplexing communication mode and a different spatial coding communication mode in which control information is used;*

*a controller configured to switch to the different spatial communication mode according to a change in a communication quality.*

*29. A wireless communication apparatus having one or more antennas comprising:*

*a receiving unit configured to receive feedback information from a receiver in a closed loop spatial multiplexing communication mode;*

*a transmitting unit configured to transmit a signal in the closed loop spatial multiplexing communication mode and a different spatial coding communication mode in which control information is used; and*

*a controller configured to switch to the different spatial coding communication mode according to a failure of communication.*

*30. A wireless communication apparatus of claim 29, wherein the feedback information indicates transmission weight information.*

*31. A wireless communication apparatus of claim 29, wherein the different spatial coding communication is spatial multiplexing communication.*

*32. A wireless communication apparatus of claim 29, wherein the different spatial coding communication is open-loop spatial multiplexing communication.*

*33. A wireless communication apparatus of claim 29, further comprising a plurality of antennas by which the transmit unit transmitting a signal in the closed loop spatial multiplexing communication mode and the different spatial coding communication mode.*

*34. A wireless communication apparatus of claim 33, wherein the different spatial coding communication is open-loop spatial multiplexing communication.*

*35. A wireless communication apparatus of claim 29, wherein the receiving unit receives information from a mobile station which reception characteristic is changed.*

*36. A wireless communication apparatus of claim 29, further comprising a circuit commonly used in both the closed loop spatial multiplexing communication mode and the different spatial coding communication mode.*

*37. A wireless communication apparatus of claim 29, wherein switch to the different spatial coding communication mode when a communication quality becomes worse.*

*38. A wireless communication apparatus of claim 29, wherein switch to the different spatial coding communication mode in response to information indicating that an amount of data to be transmitted has exceeded a predetermined data limit,*

*a transmission time during data transmission under the closed-loop spatial multiplexing communication mode has exceeded a predetermined time limit,*

*or an error rate has exceeded a predetermined value during data transmission under the closed-loop spatial multiplexing communication mode.*

*39. A wireless communication apparatus having one or more antennas comprising:*

*a transmitting unit configured to transmit feedback information in a closed loop spatial multiplexing communication mode;*

*a receiving unit configured to receive a signal in the closed loop spatial multiplexing communication mode and a different spatial coding communication mode in which control information is used;*

*a controller configured to switch to the different spatial communication mode according to a failure of communication.*

*40. A wireless communication apparatus of claim 39, wherein the feedback information indicates transmission weight information.*

*41. A wireless communication apparatus of claim 39, wherein the different spatial coding communication is spatial multiplexing communication.*

*42. A wireless communication apparatus of claim 39, wherein the different spatial coding communication is open-loop spatial multiplexing communication.*

*43. A wireless communication apparatus of claim 39, further comprising a plurality of antennas by which the transmit unit transmitting a signal in the closed loop spatial multiplexing communication mode and the different spatial coding communication mode.*

*44. A wireless communication apparatus of claim 39, wherein the wireless communication apparatus is a mobile station.*

*45. A wireless communication apparatus of claim 39, wherein the transmitting unit transmits information according to a change of reception characteristic.*

*46. A wireless communication apparatus of claim 39, further comprising a circuit commonly used in both the closed loop spatial multiplexing communication mode and the different spatial coding communication mode.*

*47. A wireless communication apparatus of claim 46, wherein the circuit is an OFDM decoder.*

*48. A wireless communication apparatus of claim 39, wherein switch to the different spatial coding communication mode when the reception characteristic becomes worse.*

*49. A wireless communication apparatus of claim 39, wherein switch to the different spatial coding communication mode in response to information indicating that an amount of data to be transmitted has exceeded a predetermined data limit,*

*a transmission time during data transmission under the closed-loop spatial multiplexing communication mode has exceeded a predetermined time limit,*

*or an error rate has exceeded a predetermined value during data transmission under the closed-loop spatial multiplexing communication mode.*

*50. A wireless communication apparatus of claim 39, further comprising a unit executes a singular value decomposition (SVD).*

*51. An information processing apparatus comprising:*

*processing circuitry configured to:*

*transmit a signal to a receiver in at least one of a closed-loop spatial multiplexing communication mode using feedback information or a spatial coding communication mode, wherein there is more feedback information in the closed-loop spatial multiplexing communication mode than in the spatial coding communication mode; and*

*switch to the spatial coding communication mode from the closed-loop multiplexing communication mode in response to deterioration of reception characteristics.*

*52. An information processing apparatus comprising:*

*processing circuitry configured to:*

*transmit a signal to a receiver in at least one of a first spatial multiplexing communication mode or a second spatial multiplexing communication mode,*

*wherein the first spatial multiplexing communication mode uses feedback information, and there is more feedback information in the first spatial multiplexing communication mode than in the second spatial multiplexing communication mode; and*

*switch to the second spatial multiplexing communication mode form the first spatial multiplexing communication mode in response to deterioration of reception characteristics.*

*53. An information processing apparatus comprising:*

*processing circuitry configured to:*

*receive a signal from a transmitter in at least one of a first spatial multiplexing communication mode or a second spatial multiplexing communication mode,*

*wherein the first spatial multiplexing communication mode uses feedback information, and there is more feedback information in the first spatial multiplexing communication mode than in the second spatial multiplexing communication mode; and*

*switch to the second spatial multiplexing communication mode form the first spatial multiplexing communication mode in response to deterioration of reception characteristics.*

*54. An information processing apparatus comprising:*

*processing circuitry configured to:*

*receive a signal from a transmitter in at least one of a first spatial multiplexing communication mode or a second spatial multiplexing communication mode,*

*wherein the first spatial multiplexing communication mode uses feedback information, and there is more feedback information in the first spatial multiplexing communication mode than in the second spatial multiplexing communication mode; and*

*set the information processing apparatus to the second spatial multiplexing communication mode in response to a notification from the transmitter indicating that the transmitter is in the second spatial multiplexing communication mode.*

* * * * *